United States Patent Office 3,512,368
Patented May 19, 1970

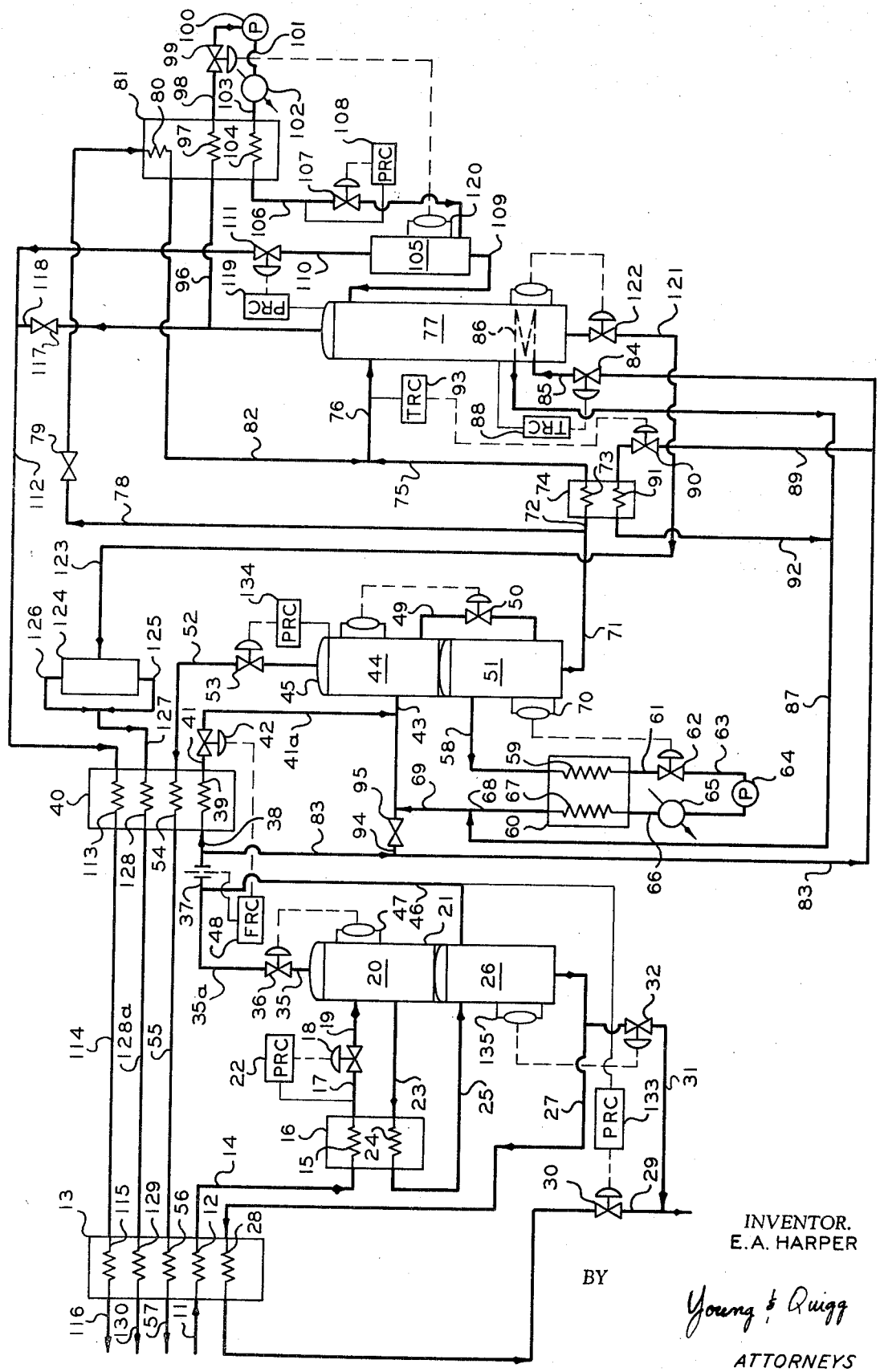

3,512,368
HELIUM AND NITROGEN CONTAINING FUEL PRODUCT RECOVERY
Ernest A. Harper, Bartlesville, Okla., assignor to Phillips Petroleum Company, a corporation of Delaware
Filed Jan. 2, 1968, Ser. No. 695,046
Int. Cl. F25j *3/02*
U.S. Cl. 62—21                               6 Claims

ABSTRACT OF THE DISCLOSURE

A natural gas feed is first reduced in temperature to liquefy the heavy hydrocarbons which are separated from a remaining uncondensed portion. The uncondensed vapors provide reboil heat for the distillation of a nitrogen and methane liquid component separated from the uncondensed vapors. Helium and nitrogen components are separately recovered as overhead in the liquefication separation and liquid fraction distillation of the remaining uncondensed vapors.

---

This invention relates to a method for the low temperature separation of gases. In one aspect this invention relates to an improved method for the recovery of constituents from natural gas.

In recent years there has been an increasing demand for helium because of new and expanding applications. Many of the new uses are in the scientific and engineering fields, such as atomic energy, missiles, aerology, space exploration, shielded-arc welding, low-temperature physics, and related areas. The world supply of naturally-available helium is limited to a very few geographical areas, most of which are in the continental United States. As far as presently known, this helium supply is even further limited as being a minor constituent of natural gas.

Various methods have been proposed for recovering helium from helium-bearing natural gases. Most of these methods employ extremely low temperatures and elevated pressures to liquefy all the constituents of the natural gas except helium thereby permitting its extraction and recovery by simple phase separation.

Because of the limited availability of helium in natural gases, manufacturers are constantly striving to develop methods which maximize helium recovery therefrom. They are also constantly striving to optimize the heat exchange between various process streams so that the cost of equipment and horsepower required to obtain the elevated pressures and extremely low temperatures necessary to effect the extraction is minimized. Any method which accomplishes either or both of these objectives is considered an advancement in the art.

The methane and nitrogen in natural gas are valuable constituents which can be utilized for various plant operations. In low-temperature helium separation processes, the liquid separated from the helium concentrate contains a mixture of these constituents. In order to produce desired high-purity nitrogen and nitrogen-containing fuel gas streams as by-products of the process, a separation of this liquid is required. A method effecting a good separation of the nitrogen from the liquid mixture is desired so that high-purity nitrogen, which can be used for such purposes as the refrigerant in a helium purification system with little or no additional purification, is produced and so that the nitrogen content in the residual liquid, which is warmed to form a gas, is minimized thereby improving the heating capability thereof as a fuel gas. A system which provides this type of separation without the addition of heat from an external source represents a significant savings in system operating costs.

Accordingly, it is an object of this invention to provide an improved method for the low temperature separation of a gas mixture.

Another object of this invention is to provide an economical and efficient method for recovering helium from natural gas.

A further object of this invention is to provide a method for low temperature separation of various constituents in natural gas which maximizes the heat exchange between various process streams.

A still further object of this invention is to provide a method for recovering a high-purity nitrogen product from natural gas without the use of heat from an external source.

A yet further object of this invention is to provide a method of recovering a fuel gas from natural gas having a low nitrogen content.

Other objects, aspects, and advantages of this invention will be apparent to those skilled in the art from the following detailed description and drawing which is a schematic flow diagram of a process embodying this invention.

According to this invention, a system is provided whereby helium is recovered from natural gas by a combination of refrigeration, heat exchange, and gas-liquid separation steps including a step whereby nitrogen is separated from the liquid, obtained upon separation of a helium concentrate, in a distillation zone with the heat energy necessary for the distillation being supplied by at least a portion of the helium separation zone feed stream passing in indirect heat exchange relationship with the fluids in the distillation zone. The overall operation is accomplished without the use of external refrigerants by expanding a plurality of process streams to a pressure low enough to cool a gas to its liquefication level and by passing other process streams in indirect heat exchange relationship therewith for cooling or heating.

Also in accordance with this invention, natural gas is first cooled to liquefy a portion thereof; the thus cooled mixture is introduced into a first separation zone; liquid is removed from the first separation zone, heat-exchanged with the natural gas feed, and withdrawn from the system as a residue gas; uncondensed gases are withdrawn from the first separation zone and cooled to liquefy a portion thereof; the thus cooled gases are introduced into a second separation zone; a liquid, comprising primarily nitrogen and methane, and uncondensed gases, comprising a helium concentrate, are withdrawn from the second separation zone; nitrogen is separated from the liquid withdrawn from the second separation zone by distillation; and a high-purity nitrogen stream and a nitrogen-containing fuel gas stream are withdrawn from the distillation zone. The latent heat of condensation and the change of enthalpy of a portion of the uncondensed gases withdrawn from the first separation zone is utilized to provide the necessary heat energy for the distillation step thereby eliminating requirements for external heating. To obtain additional heat exchange benefit, a portion of the distillation feed is passed in heat exchange relationship with the overhead vapors from the distillation zone and another portion of the feed to the distillation step is preheated as it passes in heat exchange relationship with a portion of the uncondensed gases withdrawn from the first separation zone. The high-purity nitrogen recovered from the distillation zone can be used for such purposes as the refrigerant for a helium purification system or system purging with little or no additional purification. The nitrogen-containing fuel gas recovered from the distillation zone can be used for plant fuel purposes.

Further in accordance with this invention, a method is provided for maintaining a constant flow of condensed vapors from said first to said second separation zone comprising controlling the flow rate of the liquid withdrawn from said first separation zone passing in heat exchange relationship with the natural gas feed, and thereby controlling the temperature of the feed, responsive to liquid level and vapor pressure in said first separation zone.

For a detailed description of the invention, reference is made to the drawing which is a diagrammatic representation of a low temperature separation system for separating nitrogen, nitrogen-containing fuel gas, and helium from natural gas. The term natural gas, as employed herein, is used to designate a fluid mixture comprising primarily methane with other constituents such as nitrogen, helium, argon, carbon dioxide, sulfur compounds and other saturated hydrocarbons. A natural gas feed, which has been previously treated to remove water and other undesirable constituents such as sulfur compounds, is passed through line 11, at an elevated pressure, and flow path 12 of heat exchanger 13 wherein the feed gas is substantially cooled. The cooled gas is passed through line 14 and flow path 15 of heat exchanger 16 wherein the feed gas is cooled further and partially liquefied. The cooled fluid is passed through line 17, expansion valve 18, and line 19 into chamber 20 of stabilizing column 21. Expansion valve 18 functions to decrease the pressure of the fluid passing therethrough and vapors flash from the liquid. Valve 18 is manipulated by pressure recorder-controller 22 responsive to the pressure in line 17 upstream of valve 18 to maintain a predetermined back pressure in the system.

Liquid is withdrawn from chamber 20, which acts as a liquid-gas separator, and is passed by way of line 23 through flow path 24 of heat exchanger 16, wherein the liquid is heated as its passes in heat exchange relationship with and cools fluid flowing through flow path 15, and is then passed through line 25 into the upper portion of chamber 26 of column 21. Liquid, comprising primarily nitrogen and methane with small amounts of helium and heavier saturated hydrocarbons which may exist in the feed gas, is withdrawn from chamber 26, which acts as a liquid-gas separator, by the way of line 27; passed through flow path 28 of heat exchanger 13, wherein it is heated and partially vaporized as it passes in heat exchange relationship with and cools gas flowing through flow path 12; passed through line 29 and valve 30 and withdrawn from the system for use as a residue gas. A portion of the liquid withdrawn from chamber 26 is passed through line 31 and valve 32 to line 29.

The flashed vapors from chamber 20 are withdrawn by the way of line 35, passed through valve 36, line 37, line 38, flow path 39 of heat exchanger 40, and are then passed through line 41, expansion valve 42 and line 43 into chamber 44 of helium separator 45, while the vapors from chamber 26 are withdrawn by the way of line 46 and introduced into line 37 downstream of valve 36 and upstream of heat exchanger 40. The combined vapors are partially liquefied when cooled in heat exchanger 40 and are liquefied further when flashed through expansion valve 42 prior to entry into chamber 44. The flow rate of vapors through line 35 is controlled to maintain the liquid level in chamber 20 substantially constant by means of valve 36 which is manipulated by liquid level controller 47 responsive to the liquid level in chamber 20. The fluid flow through line 35a is maintained substantially constant by means of valve 42 which is manipulated by flow recorder controller 48 responsive to the measured flow in line 35a.

Liquid is withdrawn from chamber 44, which acts as a liquid-gas separator, and is passed by the way of line 49 and valve 50 into chamber 51 of column 45. Flashed vapors, which are primarily helium and nitrogen with small amounts of methane, are withdrawn from chamber 44 to helium separator 45 and are passed by the way of line 52 and valve 53 through flow path 54 of heat exchanger 40, wherein the vapors are heated as they pass in heat exchange relationship with fluid flowing through flow path 39; through line 55; through flow path 56 of heat exchanger 13, wherein they are further heated as they pass in heat exchange relationship with gas flowing through flow path 12 and are withdrawn from the system by the way of line 57 as a crude helium product. The crude helium is passed to storage, to further processing for purification, or the like.

Vapors from chamber 51 are withdrawn through line 58 and passed through flow path 59 of heat exchanger 60 wherein they are heated. The heated vapors are passed through line 61, valve 62, line 63, compressor 64, cooler 65, line 66, through flow path 67 of heat exchanger 60 wherein they are cooled while passing in heat exchange with vapor flowing through flow path 59, line 68, line 69, and recycled to chamber 44 of helium separator 45 via line 43. The flow rate of vapors through line 58 can be controlled to maintain the liquid level in chamber 51 substantially constant by means of valve 62 which is manipulated by liquid level controller 70 responsive to the liquid level in chamber 51.

Liquid, containing nitrogen and methane, is withdrawn from chamber 51 through line 71. A portion of this liquid is passed through line 72 and flow path 73 of heat exchanger 74, wherein it is heated and partially vaporized, and through lines 75 and 76 as feed into distillation column 77. A portion of the liquid from chamber 51 is passed through line 78, valve 79, flow path 80 of heat exchanger 81, wherein it is heated and partially vaporized, and through lines 82 and 76 into distillation column 77. This routing of the liquid provides preheating prior to entry into distillation column 77.

The flow of mixed vapors passing from column 21 through line 37 is split prior to entering heat exchanger 40 and a portion is passed through line 83, valve 84 and line 85 to distillation column 77, through reboiler coils 86, through line 87, and is introduced into helium separation column 45 through lines 69 and 43. This routing of the mixed vapors provides the necessary heating for distillation column 77 for the separation of nitrogen from methane as described hereinafter, i.e. the vapors partially change to liquid phase within the coils 86 of column 77 and the heat evolved provides the necessary heating. The flow of vapors through line 85 is controlled to provide the proper heating by means of valve 84 which is manipulated by temperature recorder-controller 88 responsive to the temperature of the liquid in distillation column 77.

A portion of the vapors passing through line 83 is passed through line 89, valve 90, flow path 91 of heat exchanger 74, wherein they are cooled as they pass in heat exchange relationship with liquid flowing through flow path 73, and lines 92, 87, 69 and 43 into chamber 44 of helium separator 45. This routing provides additional cooling of the vapors prior to introduction into chamber 44 in adidtion to preheating the liquid flowing to distillation column 77. The flow rate of vapors through line 89 is controlled to provide the proper temperature of liquid flowing through line 75 by means of valve 90 which is manipulated by temperature recorder-controller 93 responsive to the temperature level of the liquid in line 76. If desired for temperature control of feed to chamber 44, a portion of the vapors in line 83 can be flowed to bypass both heat exchanger 40 and coils 86 through valve 95 and line 94.

The preheated fluid, comprising primarily nitrogen and methane, flowing through line 76 is separated in distillation column 77 into nitrogen and methane by heating the liquid therein above the boiling point of nitrogen. Overhead vapors, containing primarily nitrogen with small amounts of methane and a trace of helium, are passed through line 96 and flow path 97 in heat exchanger 81 wherein the vapors are heated. The heated vapors are passed through line 98, valve 99, compressor 100, line 101, cooler 102, line 103, flow path 104, of heat exchanger 81, and to accumulator 105 through line 106 and expansion valve 107. Expansion valve 107 functions to decrease the pressure of fluid passing therethrough and flashing of vapors from the liquid occurs. Valve 107 is manipulated by pressure recorder-controller 108 responsive to the line pressure in line 106 to maintain a constant pressure therein. Liquid, comprising primarily nitrogen with some methane, is recycled from accumulator 105 to distillation column 77 as reflux through line 109. Flashed vapors, comprising high-purity nitrogen, are passed overhead from accumulator 105 through line 110, valve 111, line 112, flow path 113 of heat exchanger 40, wherein the vapors are heated, as they pass in heat exchange relationship vapors flowing through flow path 39, line 114, flow path 115 of heat exchanger 13, wherein the vapors are heated further as they pass in heat exchange relationship with and cool the feed flowing through flow path 12. High-purity nitrogen is withdrawn from the system via line 116 for use as purging, pressurizing medium, refrigerant in a helium purification system, or the like.

The flow rate of overhead vapors passing from accumulator 105 is controlled to maintain the pressure in distillation column 77 substantially constant by means of vavle 111 which is manipulated by pressure recorder-controller 119 responsive to the pressure in column 77. The flow of vapors through line 98 is controlled to maintain the liquid level in accumulator 105 substantially constant by means of valve 99 which is manipulated by liquid level controller 120 responsive to the liquid level in accumulator 105.

Liquid, comprising approximately 51 mol percent nitrogen and 49 mol percent methane, is withdrawn from column 77 as the kettle product and passed through line 121 and valve 122. The pressure drop across valve 122 causes some vapors to flash from the liquid. The mixture of flashed vapors and liquid is passed through line 123 to flash tank 124 wherein the vapors are separated from the liquid. Substantially proportional quantities of liquid and vapors are introduced through lines 125 and 126 into line 127 and passed through flow path 128 of heat exchanger 40. As disclosed by U.S. Pat. 3,212,277, E. A. Harper (1965), the separation of the vapors and liquid and recombination ensures uniform proportioning of the resulting two-phase fluid, and therefore uniform heat transfer to the other streams flowing through the heat exchanger, as it passes through heat exchanger 40. For the sake of completeness the disclosure of the above patent is incorporated by reference herein. The liquid is vaporized in heat exchanger 40, as it passes in heat exchange relationship with and cools vapors flowing through flow path 39, and the resulting vapors are passed through line 128a, flow path 129 in heat exchanger 13, wherein the vapors are further heated as they pass in heat exchange relationship and cool feed gas flowing through flow path 12, and the vapors are withdrawn from the system through line 130 and passed to a point where they can be utilized as a plant fuel or passed to another point of utility as desired.

Since the vapors withdrawn from chamber 20 are the feed streams to chamber 44, the pressure in line 37 must be higher than the pressure in chamber 44 to provide the necessary driving force to the stream. It is necessary to maintain the vapors in line 37 at a substantially constant flow rate to prevent adverse downstream system upsets. For instance, the operating temperature is extremely critical. Small variations of the flow rate of vapors through line 83 and coils 86 could cause the column to fill with liquid if the flow decreases, could cause the column to empty if the flow increases, or could cause the loss of reflux. Any of these occurrences would necessitate a system shutdown and restart.

Maintenance of the pressure necessary to maintain the flow rate of vapors flowing through line 37 constant is provided by controlling the flow rate of liquid passing through flow path 28, in heat exchanger 13, in heat exchange relationship with the feed mixture flowing through flow path 12 of heat exchanger 13. Hence, the temperature of the feed is maintained at a level necessary to obtain the formation of a sufficient quantity of vapors when flashed in chamber 20 to maintain a constant pressure in line 37. The pressure in chamber 26 is maintained at a predetermnied level by valve 32 which is manipulated by pressure recorder-controller 133 responsive to the pressure therein. Valve 32 is manipulated by liquid level controller 135 responsive to the liquid level in chamber 26 to maintain a substantially constant liquid level in chamber 26. The flow rate of vapors through line 52 is controlled to maintain the pressure in chamber 44 at a substantially constant pressure by means of valve 53 which is manipulated by pressure recorder-controller 134 responsive to the pressure in chamber 44. The set point on pressure recorder-controller 133 is adjusted to a valve corresponding to a pressure level sufficiently higher than the pressure level corresponding to the set point on pressure recorder-controller 134 to maintain the necessary driving force to flow the vapors from chamber 20 to chamber 44.

The following specific example is presented to further illustrate the objects and advantages of this invention but is not to be construed to unduly limit same.

EXAMPLE I

A system in accordance with the drawing for the recovery of helium, nitrogen, a low B.t.u. gas and a residue gas is operated under the conditions and results set forth in the following table.

TABLE

| | Operating conditions | | |
|---|---|---|---|
| Stream No. | Temperature, °F. | Pressure, p.s.i.g. | Flow rate, lbs./hr. |
| 14 | −196 | 397 | 43,848 |
| 17 | −202 | 395 | 43,848 |
| 23 | −290 | 272 | 37,395 |
| 27 | −204 | 270 | 35,665 |
| 35 | −209 | 272 | 6,453 |
| 46 | −204 | 270 | 1,730 |
| 37 | −208 | 268 | 8,184 |
| 38 | −208 | 268 | 6,506 |
| 41 | −265 | 266 | 6,506 |
| 41a | −258 | 260 | 8,597 |
| 49 | −258 | 260 | 7,274 |
| 52 | −258 | 260 | 1,323 |
| 55 | −215 | 61 | 4,499 |
| 57 | −160 | 257 | 1,323 |
| 58 | −264 | 137 | 412 |
| 63 | 82 | 125 | 412 |
| 66 | 90 | 275 | 412 |
| 68 | −246 | 266 | 412 |
| 71 | −264 | 137 | 6,861 |
| 72 | −264 | 137 | 5,191 |
| 75 | −259 | 135 | 5,191 |
| 76 | −259 | 135 | 6,859 |
| 78 | −264 | 137 | 1,668 |
| 82 | −259 | 135 | 1,668 |
| 85 | −208 | 268 | 900 |
| 87 | −244 | 266 | 900 |
| 89 | −208 | 268 | 1,227 |
| 92 | −250 | 266 | 1,227 |
| 96 | −263 | 133 | 2,709 |
| 98 | 84 | 130 | 2,709 |
| 103 | 90 | 300 | 2,709 |
| 106 | −247 | 290 | 2,709 |
| 109 | −269 | 133 | 347 |
| 110 | −269 | 133 | 2,362 |
| 112 | −275 | 36 | 2,362 |
| 114 | −215 | 35 | 2,362 |
| 116 | −160 | 33 | 2,362 |
| 121 | −256 | 133 | 4,499 |
| 127 | −275 | 62 | 4,499 |
| 128a | −215 | 61 | 4,499 |
| 130 | −160 | 60 | 4,499 |

COMPOSITION OF FEED AND PRODUCT STREAMS

| | Composition, mol percent | | | | |
|---|---|---|---|---|---|
| Stream No. | He | N$_2$ | C$_1$ | C$_2$ | C$_3$ |
| 14 | 1.18 | 28.01 | 70.08 | 0.71 | 0.02 |
| 27 | 0.01 | 20.64 | 78.47 | 0.85 | 0.02 |
| 57 | 34.14 | 62.77 | 3.09 | | |
| 116 | .01 | 98.03 | 1.96 | | |
| 130 | | 50.96 | 49.04 | | |

From the foregoing disclosure and example it can be seen that this invention provides a process whereby helium recovery from the feed gas is maximized. Virtually all the helium in the feed gas is recovered with the vapor stream withdrawn from the helium separator with only a very minute amount of helium being removed with the liquids withdrawn from the stabilizing column and helium separator. Also, a high-purity nitrogen product (approximately 98 mol percent nitrogen in stream 116) is recovered from the natural gas without the requirement for external heat energy to effect the distillation of same from the liquid withdrawn from the helium separator.

As noted above, the drawing is merely diagrammatic and is not intended to show all component parts of the equipment which one skilled in the art will routinely design for the operation. Those components which will be readily apparent to those skilled in the art have been purposely omitted for the purposes of clarity.

As will be evident to those skilled in the art, various modifications and alterations can be made to this invention in view of the foregoing disclosure without departing from the spirit and scope thereof.

I claim:

1. A process for separating constituents from natural gas comprising:
   (a) cooling and partially liquefying a natural gas feed containing helium, nitrogen, methane and heavier hydrocarbons;
   (b) removing a portion of the methane and substantially all of the hydrocarbons heavier than methane as a liquid from the thus cooled mixture of vapors and liquid;
   (c) further cooling and partially liquefying a portion of the uncondensed vapors from the thus cooled mixture of vapors and liquid;
   (d) separating the remaining uncondensed vapors from the further cooled mixture of vapors and liquid and removing said remaining uncondensed vapors as a helium concentrate product of the process; and
   (e) distilling the remaining liquid in step (d) to obtain a high-purity nitrogen product and a nitrogen-containing fuel product, the heat energy necessary for said distillation being provided by the uncondensed vapors of step (b) other than the vapors cooled by step (c) which are passed in indirect heat exchange relationship with said remaining liquid.

2. A process for separating constituents from natural gas, comprising:
   (a) cooling and partially liquefying a natural gas feed containing helium, nitrogen, methane and heavier hydrocarbons;
   (b) passing the thus cooled mixture of vapors and liquid into a first liquid-vapor separation zone;
   (c) withdrawing a first liquid stream from said first liquid-vapor separation zone containing a portion of the methane and substantially all of the hydrocarbons heavier than methane in said feed gas;
   (d) withdrawing a first vapor stream containing uncondensed vapors from said first liquid-vapor separation zone;
   (e) cooling and partially liquefying a second vapor stream comprising a portion of the uncondensed vapors in said first vapor stream;
   (f) passing the thus cooled mixture of vapors and liquids of said second vapor stream into a second liquid-vapor separation zone;
   (g) withdrawing a stream containing vaporous helium from said second liquid-vapor separation zone;
   (h) withdrawing a second liquid stream containing primarily nitrogen and methane from said second liquid-vapor separation zone;
   (i) passing a third vapor stream comprising a portion of the uncondensed vapors of said first vapor stream in indirect heat exchange relationship with a third liquid stream comprising at least a portion of the liquid in said second liquid stream thereby heating and partially vaporizing the liquid in said third liquid stream;
   (j) passing the thus heated mixture of liquid and vapors of said third liquid stream into a distillation zone;
   (k) passing a fourth vapor stream comprising the remainder of the uncondensed vapors in said first vapor stream in indirect heat exchange relationship with fluids containing nitrogen in said distillation zone, the vapors in said fourth vapor stream being partially liquefied while passing through said distillation zone and the heat of condensation thereof providing the heat energy required to vaporize the portion of the nitrogen in said fluids in said distillation zone;
   (l) withdrawing a stream containing high-purity, vaporous nitrogen from said distillation zone;
   (m) withdrawing a fourth liquid stream containing methane and nitrogen from said distillation zone; and
   (n) vaporizing the liquid in said fourth liquid stream and recovering the thus vaporized stream.

3. The process according to claim 2 further comprising passing a fifth liquid stream comprising a portion of the liquid in said second liquid stream in indirect heat exchange relationship with said stream of vaporous nitrogen withdrawn from said distillation zone thereby heating and partially vaporizing the liquid in said fifth liquid stream and passing the thus heated mixture of liquid and vapors of said fifth liquid stream into said distillation zone.

4. A process for separating constituents from natural gas comprising:
   (a) passing a natural gas feed containing helium, nitrogen, methane, and heavier hydrocarbons through a first heat exchanging zone to cool and patrially liquefy said feed gas;
   (b) passing the thus cooled feed through a second heat exchanging zone to further cool said thus cooled feed;
   (c) passing the said thus further cooled feed into a first liquid-vapor separation zone;
   (d) removing a liquid containing a portion of the methane and substantially all of the hydrocarbons heavier than methane in said feed gas from said first liquid-vapor separation zone;
   (e) passing the thus removed liquid from said first liquid-vapor separation zone through said second heat exchanging zone in indirect heat exchange relationship with said thus cooled feed gas and into a second liquid-vapor separation zone;
   (f) removing a liquid containing a portion of the methane and substantially all of the hydrocarbons heavier than methane in said feed gas from said second liquid-vapor separation zone;
   (g) passing a portion of the thus removed liquid from said second liquid-vapor separation zone through said first heat exchanging zone in indirect heat exchange relationship with said feed gas;
   (h) withdrawing uncondensed gases from said first and second liquid-vapor separation zones;
   (i) admixing said uncondensed gases withdrawn from said first and second liquid-vapor separation zones;
   (j) passing a first portion of the resulting admixture of the uncondensed gases through a third heat exchanging zone to cool said admixture;
   (k) passing the thus cooled first portion of said admixture into a third liquid-vapor separation zone;
   (l) withdrawing a liquid from said third liquid-vapor separation zone;
   (m) passing the thus removed liquid from said third liquid-vapor separation zone into a fourth liquid-vapor separation zone;
   (n) withdrawing a liquid containing primarily methane and nitrogen from said fourth liquid-vapor separation zone;
   (o) passing at least a portion of the thus removed liquid from said fourth liquid-vapor separation zone through a fourth heat exchanging zone to heat same and then to a distillation zone which includes a fifth heat exchanging zone;

(p) passing a second portion of the resulting admixture of said uncondensed vapors through said fourth heat exchanging zone in indirect heat exchange relationship with said at least portion of liquid withdrawn from said fourth separation zone and then into said third separation zone;

(q) passing a third portion of the resulting admixture of said uncondensed vapors from said first and second liquid-vapor separation zones through said fifth heat exchanging zone in indirect heat exchange relationship with fluids in said distillation zone, the vapors passing through said fifth heat exchanging zone being partially liquefied and the heat released thereby providing the required heat energy to vaporize a portion of the nitrogen in said fluids in said distillation zone;

(r) withdrawing uncondensed vapors comprising primarily helium and nitrogen from said third liquid-vapor separation zone;

(s) passing the thus withdrawn vapors from said third liquid-vapor separation zone through said third heat exchanging zone in indirect heat exchange relationship with said first portion of the resulting admixture of said uncondensated vapors and then through said first heat exchanging zone in indirect heat exchange relationship with said feed gas;

(t) withdrawing vapors comprising high-purity nitrogen from said distillation zone;

(u) passing the thus withdrawn vapors from said distillation zone through said third heat exchanging zone in indirect heat exchange relationship with said first portion of the admixture of said uncondensed vapors and then through said first heat exchanging zone in indirect heat exchange relationship with said feed gas;

(v) withdrawing a liquid containing nitrogen and methane from said distillation zone;

(w) passing the thus withdrawn liquid from said distillation zone through said third heat exchanging zone in indrect heat exchange relationship with said first portion of the admixture of said uncondensed vapors thereby vaporizing same; and (x) passing the thus vaporized stream from said third heat exchanging zone through said first heat exchanging zone in indirect heat exchange relationship with said feed gas.

5. The process according to claim 4 further comprising:
(a) passing a second portion of said thus withdrawn liquid from said fourth liquid-vapor separation zone through a sixth heat exchanging zone to heat and partially vaporize same;
(b) passing the thus vaporized stream from said sixth heat exchanging zone through said distillation zone;
(c) passing a portion of said thus withdrawn vapors from said distillation zone through said sixth heat exchanging zone in indirect heat exchange relationship with said second portion of said thus liquid withdrawn from said fourth liquid-vapor separation zone and then into an accumulator;
(d) withdrawing a liquid from said accumulator and passing same to said distillation zone; and
(e) withdrawing vapors from said accumulator and admixing same wtih the other portion of said vapors withdrawn from said distillation zone upstream of said third heat exchanging zone.

6. The process according to claim 4 further comprising:
(a) measuring the pressure of said admixed vapors of step (i) and producing a first signal representative thereof;
(b) controlling the flow rate of said liquid of step (g) responsive to said first signal so as to maintain a substantially constant pressure of said admixed vapors;
(c) measuring the liquid level in said second liquid-vapor separation zone and producing a second signal representative thereof; and
(d) controlling the rate of removal of the liquid of step (f) other than that of step (g) in response to said second signal.

References Cited
UNITED STATES PATENTS

| | | | |
|---|---|---|---|
| 2,475,957 | 7/1949 | Gilmore | 62—27 |
| 3,293,869 | 12/1966 | Karbosky | 62—23 |
| 3,319,429 | 5/1967 | Pryor | 62—28 |

NORMAN YUDKOFF, Primary Examiner

ARTHUR PURCELL, Assistant Examiner

U.C. Cl. X.R.

62—23, 27, 31